(12) United States Patent
Simonneau et al.

(10) Patent No.: US 9,803,683 B2
(45) Date of Patent: Oct. 31, 2017

(54) PIVOTABLE SHEATH STOP FOR A SHEATH, AND CORRESPONDING BRACKET, GUIDE RAIL, ASSEMBLY, WINDOW LIFT, AND MOUNTING METHOD

(71) Applicant: INTEVA PRODUCTS FRANCE SAS, Sully sur Loire (FR)

(72) Inventors: Eric Simonneau, Vienne en Val (FR); Nicolas Galliot, Sully sur Loire (FR); Eric Remond, Noyers (FR); Jean-Louis Robalo, Varennes Changy (FR)

(73) Assignee: INTEVA PRODUCTS FRANCE SAS, Sully sur Loire (FR)

( * ) Notice: Subject to any disclaimer, the term of this patent is extended or adjusted under 35 U.S.C. 154(b) by 14 days.

(21) Appl. No.: 14/778,751

(22) PCT Filed: Mar. 3, 2014

(86) PCT No.: PCT/EP2014/054054
§ 371 (c)(1),
(2) Date: Sep. 21, 2015

(87) PCT Pub. No.: WO2014/146890
PCT Pub. Date: Sep. 25, 2014

(65) Prior Publication Data
US 2016/0047411 A1    Feb. 18, 2016

(30) Foreign Application Priority Data
Mar. 21, 2013    (FR) ...................................... 13 52543

(51) Int. Cl.
*F16C 1/26* (2006.01)
*E05F 11/48* (2006.01)
(Continued)

(52) U.S. Cl.
CPC ................... *F16C 1/26* (2013.01); *B60J 1/17* (2013.01); *E05F 7/08* (2013.01); *E05F 11/488* (2013.01);
(Continued)

(58) Field of Classification Search
CPC ..... E05F 11/485; E05F 11/486; E05F 11/488; E05F 15/695; F16C 1/26; B60J 1/17;
(Continued)

(56) References Cited

U.S. PATENT DOCUMENTS 4,171,594 A * 10/1979 Colanzi ................. E05F 15/689
49/349
4,199,899 A * 4/1980 Muhling ............... E05F 11/485
49/352
(Continued)

FOREIGN PATENT DOCUMENTS

DE    2750904 C2    10/1983
EP    0208603    1/1987
(Continued)

OTHER PUBLICATIONS

English Translation to FR 2760695 Abstract.
(Continued)

*Primary Examiner* — Justin Rephann
(74) *Attorney, Agent, or Firm* — Cantor Colburn LLP

(57) ABSTRACT

The invention relates to a sheath stop including: a hole through which a window lift cable is to pass; and a sheath abutment for locking the sheath of the window lift cable on one side of the sheath stop and wherein, on the other side of the sheath stop, the sheath stop includes a shaft provided so as to be mounted onto a bracket of the sheath stop such that the sheath stop has a freely rotatable mounting configuration on the bracket. The shaft extends transversely to the main orientation of the passage hole, and the passage hole has a partial side clearance that allows the cable a degree of
(Continued)

bending freedom within a plane perpendicular to the shaft when the sheath stop freely pivots about the shaft.

16 Claims, 4 Drawing Sheets

(51) Int. Cl.
*E05F 15/695* (2015.01)
*B60J 1/17* (2006.01)
*E05F 7/08* (2006.01)
*E06B 3/44* (2006.01)

(52) U.S. Cl.
CPC ............. *E05F 15/695* (2015.01); *E06B 3/44* (2013.01); *F16C 1/265* (2013.01); *E05Y 2201/662* (2013.01); *E05Y 2600/32* (2013.01); *E05Y 2600/56* (2013.01); *E05Y 2600/60* (2013.01); *E05Y 2800/00* (2013.01); *E05Y 2800/26* (2013.01); *E05Y 2900/55* (2013.01); *F16C 2350/00* (2013.01)

(58) Field of Classification Search
CPC ........... E05Y 2900/55; E05Y 2201/654; E05Y 2201/662; E05Y 2201/66; E05Y 2201/672
See application file for complete search history.

(56) References Cited

U.S. PATENT DOCUMENTS

| | | | | |
|---|---|---|---|---|
| 4,201,014 A * | 5/1980 | Hess | ................... | E05F 11/483 49/325 |
| 4,235,046 A * | 11/1980 | Hess | ................... | E05F 11/485 49/352 |
| 4,657,523 A | 4/1987 | Chevance et al. | | |
| 5,617,675 A * | 4/1997 | Kobrehel | .............. | E05F 11/485 49/352 |
| 5,623,785 A * | 4/1997 | Mariel | .................. | E05F 11/485 49/352 |
| 5,782,038 A * | 7/1998 | Sponable | .............. | E05F 11/486 49/349 |
| 5,950,365 A * | 9/1999 | Lieb | ........................... | B60J 1/17 49/28 |
| 6,161,337 A * | 12/2000 | Morando | ............... | B60J 5/0416 49/348 |
| 6,178,845 B1 | 1/2001 | Gutschner | | |
| 6,193,621 B1 * | 2/2001 | McClosky | ................ | F16C 1/22 474/101 |
| 6,272,948 B1 * | 8/2001 | Klippert | ................ | E05F 11/485 74/500.5 |
| 6,453,615 B1 * | 9/2002 | Berta | ..................... | B60J 5/0416 49/349 |
| 2003/0097798 A1 * | 5/2003 | Staser | .................... | B60J 5/0416 49/502 |
| 2003/0140562 A1 * | 7/2003 | Staser | ................... | E05F 11/382 49/352 |
| 2004/0134130 A1 * | 7/2004 | Dobson | ................. | E05F 11/486 49/352 |
| 2004/0144032 A1 * | 7/2004 | Smith | ................... | E05F 11/486 49/352 |
| 2004/0262442 A1 * | 12/2004 | Mazouzi | ............... | E05F 11/485 242/390.8 |
| 2005/0011130 A1 * | 1/2005 | Klippert | ................ | E05F 11/485 49/352 |
| 2005/0016070 A1 * | 1/2005 | Cardine | ................ | E05F 11/485 49/352 |
| 2005/0194580 A1 * | 9/2005 | Mazouzi | ............... | E05F 11/485 254/231 |
| 2007/0293722 A1 * | 12/2007 | Casalini | .................. | F16C 1/226 600/121 |
| 2009/0090065 A1 * | 4/2009 | Kinoshita | .................. | B60J 1/17 49/352 |
| 2010/0043295 A1 * | 2/2010 | Barr | ...................... | E05F 11/485 49/352 |
| 2010/0154310 A1 * | 6/2010 | Robalo | ................. | E05F 11/488 49/352 |
| 2013/0283697 A1 * | 10/2013 | Galliot | .................. | E05F 11/488 49/352 |

FOREIGN PATENT DOCUMENTS

| | | |
|---|---|---|
| EP | 0942185 | 9/1999 |
| FR | 2441711 A1 | 7/1980 |
| FR | 2584469 A1 | 1/1987 |
| FR | 2760695 | 9/1998 |

OTHER PUBLICATIONS

English Translation to EP 0 942 185 Abstract.
English Translation to EP 0 208 603 Abstract.
International Search Report for PCT/EP2014/054054 dated Mar. 9, 2014.
Chinese Office Action for CN Application No. 201480027041.8 dated Sep. 20, 2016.
English Abstract FR2441711.
English Abstract FR2584469.

* cited by examiner

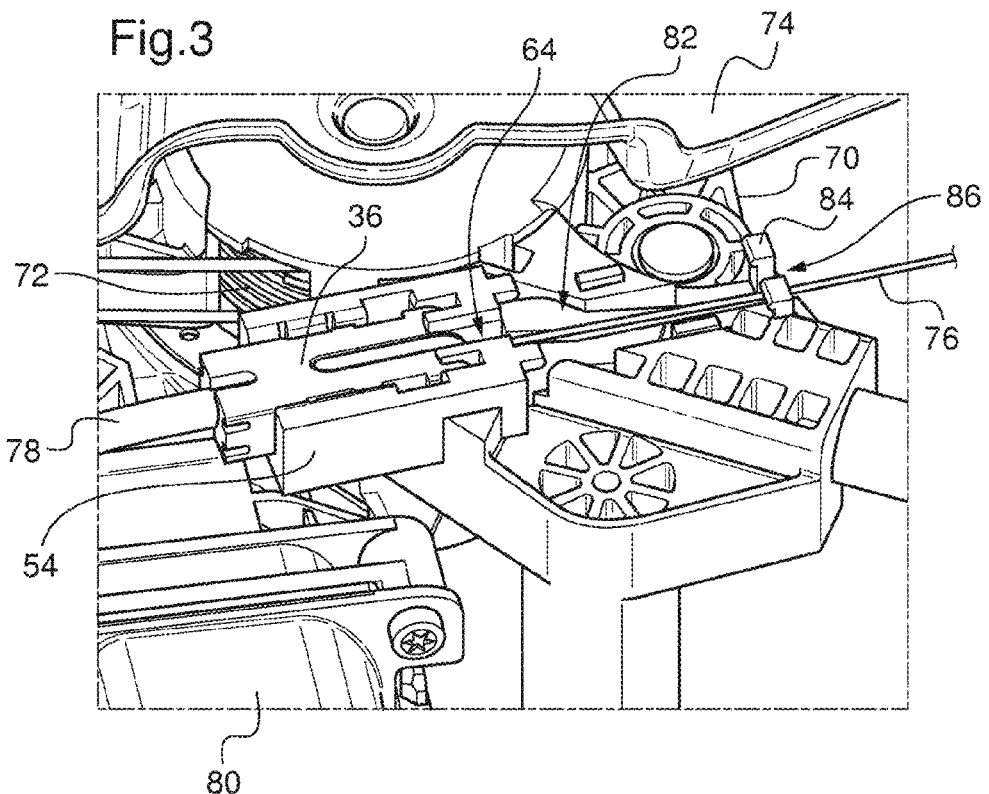
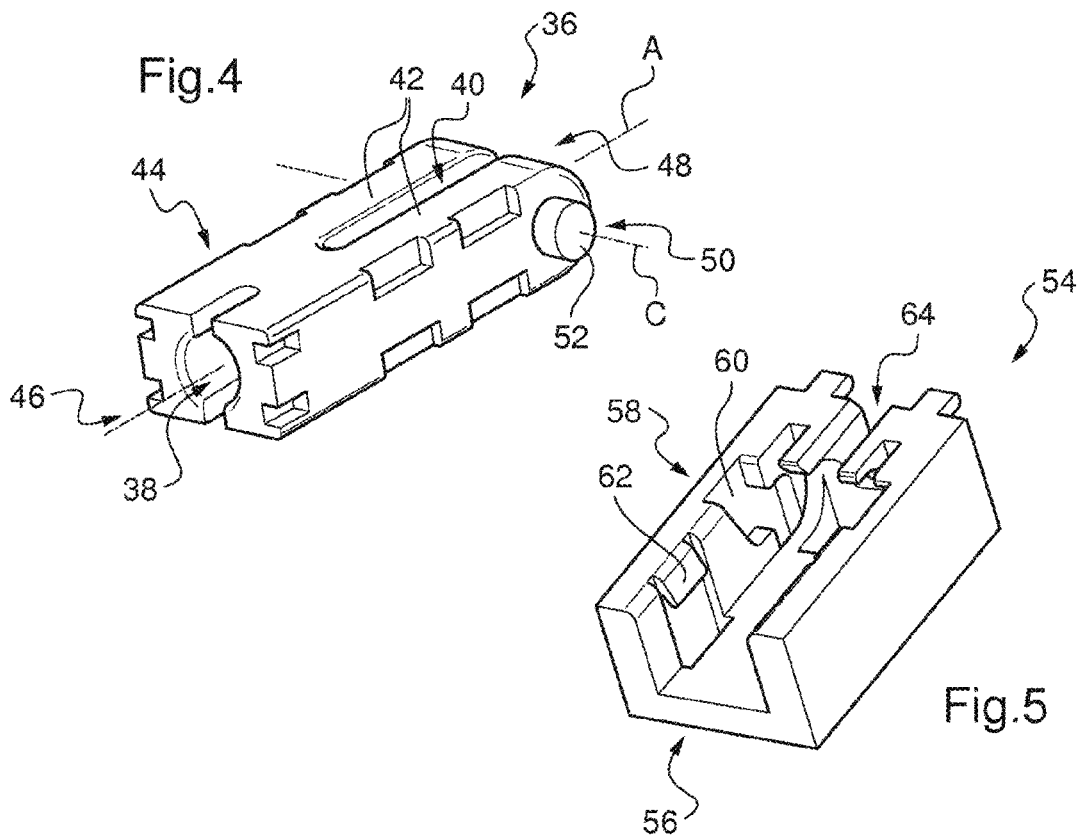

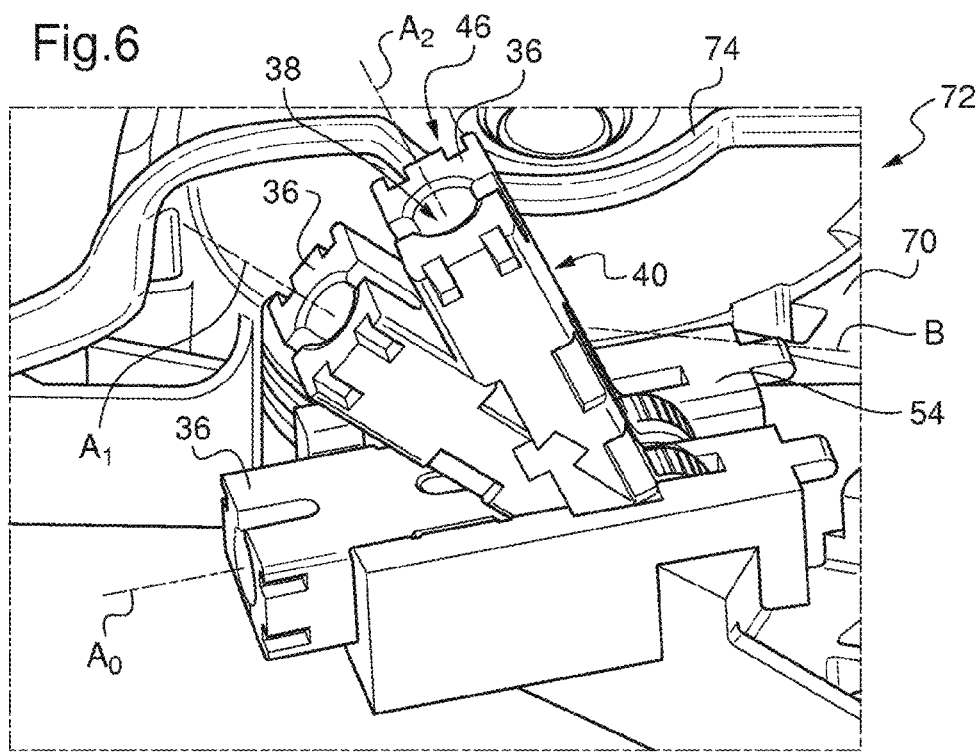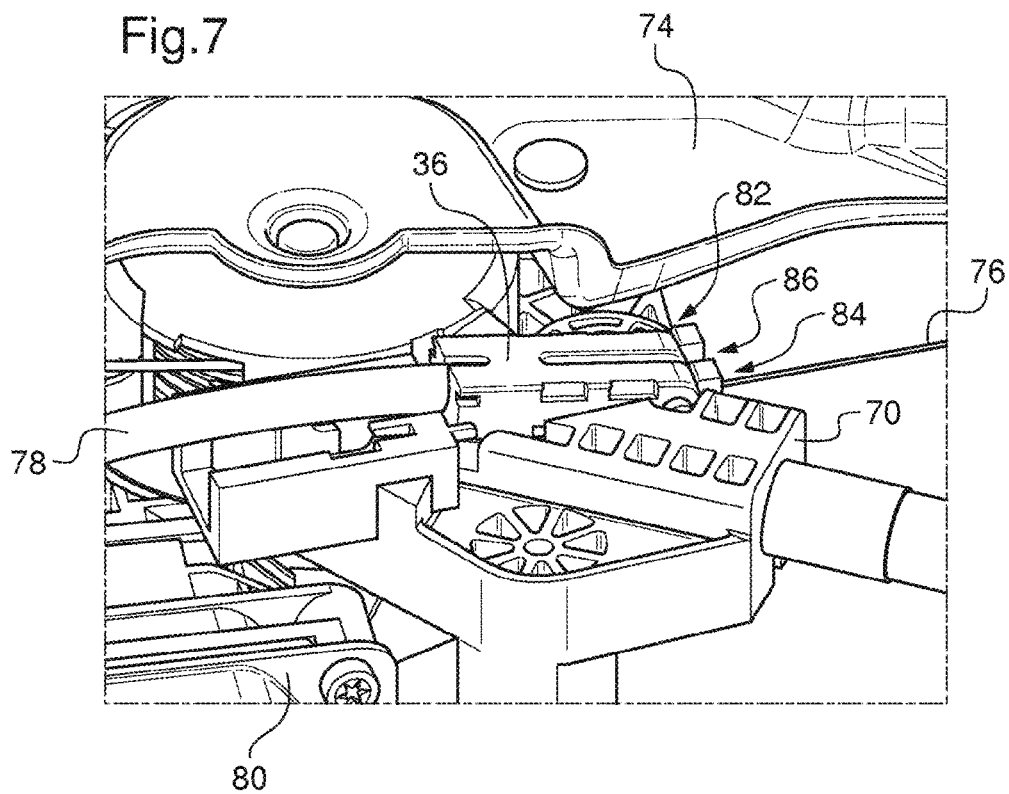

PIVOTABLE SHEATH STOP FOR A SHEATH, AND CORRESPONDING BRACKET, GUIDE RAIL, ASSEMBLY, WINDOW LIFT, AND MOUNTING METHOD

CROSS REFERENCE TO RELATED APPLICATIONS

This application is a National Stage of International Application Number PCT/EP2014/054054 filed Mar. 3, 2014, which claims priority to French Patent Application No. FR 13 52 543 filed Mar. 21, 2013, the entire contents each of which are incorporated herein by reference thereto.

TECHNICAL FIELD

The present invention relates to a sheath stop for a sheath for a window lift. The invention also relates to an assembly comprising such a sheath stop and to a window lift comprising such an assembly. The invention further relates to a method for mounting for such a sheath stop.

BACKGROUND

In the motor vehicle sector, there is a known type of window lift as illustrated in FIG. 1. A window lift 20 comprises two guide rails 22 arranged inside a door of a motor vehicle. Sliders 24 ensure the movement of a window (not represented). Each slider 24 is guided in translation by one of the guide rails 22. The sliders 24 are presented in FIG. 1 in three different operating positions, but, in operation, only two sliders 24 are present on the window lift 20, one on each guide rail 22. A system of cables 26 for moving the sliders 24 passes over the guide rails 22. Deflecting rollers 28 in the form of pulleys are arranged at the ends of the guide rails 22 so as to cooperate with the system of cables 26. The system of cables 26 comprises a plurality of window lift cables 30.

For the operation of the window lift 20, it is known to use the cables 30 under tension. More particularly, once installed on the window lift 20, the cables 30 may be permanently tensed and this even when the window is not being moved. The tensioning of the cables 30 is carried out at the time of the installation of the system of cables 26 on the window lift 20 and it consists in passing the system of cables 26, in particular between the sliders 24 and around the pulleys forming deflecting rollers 28. An operator can then be provided with a specific tool allowing him to pass one of the cables 30 around one of the pulleys forming deflecting rollers 28, in spite of the simultaneous tensioning of the cable 30. In the case where the window lift 20 comprises a system for taking up play of the cables 30, the tensioning of the cables 30 also makes it possible to tension the system taking up play. Such tensioning is a difficult and time-consuming operation, and it risks damaging the cables 30.

Thus, there is a need for a window lift with a system of cables wherein the mounting of the system of cables on the window lift is facilitated.

SUMMARY OF THE INVENTION

For this purpose, the invention proposes a sheath stop for a sheath that partially surrounds a window lift cable, the sheath stop including:
a hole for the passage of the window lift cable through the sheath stop;
a sheath abutment for locking, on one side of the sheath stop relative to the passage hole, the locking of the sheath of the window lift cable passing through the sheath stop,
and, in which, on the other side of the sheath stop relative to the hole,
the sheath stop includes a shaft provided for being mounted on a sheath stop bracket in such a manner that the sheath stop has a freely rotatable mounting configuration on the bracket, the shaft extending transversely to the main orientation of the passage hole; and
the passage hole has a partial side clearance that allows the cable passing through the sheath stop a degree of bending freedom in the plane perpendicular to the shaft when the sheath stop pivots freely about the shaft.

According to preferred embodiments, the invention includes one of the following features:
the shaft is formed from two stubs extending on either side of the passage hole of the sheath stop, the stubs being separated by the side clearance of the passage hole;
the sheath stop includes two bearings defining the axis, the bearings being provided for being mounted on corresponding stubs of the sheath stop bracket during the mounting of the sheath stop on the bracket in a freely rotatable mounting configuration on the bracket, the two bearings being placed on either side of the passage hole and being separated by the side clearance of the passage hole.

Moreover, a sheath stop bracket has been proposed, which includes a housing for receiving in locking position the preceding sheath stop, the housing including an interface for mounting the shaft of the sheath stop, so that when the shaft cooperates with the mounting interface, the sheath stop bracket is suitable for allowing the free rotation of the sheath stop until reaching the locking position in the housing.

According to preferred embodiments, the proposed bracket includes one or more of the following features:
the receiving housing comprises a clamp forming a spring, which is suitable for locking the sheath stop when the sheath stop is pivoted in the housing in locking position;
the mounting interface is suitable for cooperating with the shaft of the sheath stop formed from two stubs, the mounting interface comprising, for each stub, a corresponding groove for guiding when the sheath stop is in the freely rotatable mounting configuration.

Proposed in particular is a guide rail for a window lift, which includes the preceding bracket.

According to a preferred embodiment, the proposed guide rail comprises a plate for receiving a winding drum for a system of window lift cables, the sheath stop bracket forming one piece with a plate.

In addition, an assembly is proposed which includes:
the preceding sheath stop; and
the preceding sheath stop bracket, the shaft of the sheath stop being mounted in the mounting interface for the shaft of the sheath stop.

A lift cable is also proposed, which comprises:
a slider for moving a window;
the preceding guide rail for the slider including a sheath stop bracket,
a system of cables for moving the slider along the guide rail, the system of cables including:
a cable; and
a sheath partially surrounding the cable, in which the cable slides freely to allow the moving of the slider along the guide rail when the cable is tensioned, in spite of a partial bending of the portion of the cable surrounded by the sheath;

the cable passing through the sheath stop of the assembly through the passage hole, with the sheath arranged facing the sheath abutment of the sheath stop;

the bracket being arranged on the guide rail in such a manner that, in the freely rotatable mounting configuration, the free pivoting of the sheath stop toward the locking position increases the tension of the cable.

According to a preferred embodiment, the window lift includes an additional slider and a respective additional guide rail, the cable passing through the sheath stop connecting an end of the guide rail to an end of the additional guide rail, the cable passing through the sheath stop connecting the slider to the additional slider.

Moreover, a method for mounting a sheath stop for the preceding window lift is proposed, for the purpose of tensioning a window lift cable, comprising:

(a) the placement of the sheath stop on the bracket in the freely rotatable mounting configuration;

(b) the pivoting of the sheath stop about the shaft until the locking position is reached in such a manner as to tension the cable.

According to a preferred embodiment of the mounting method, the bracket comprises a detachable attachment arrangement for the sheath stop premounted on the bracket, the method comprising, before the placement of the sheath stop in the freely rotatable mounting configuration on the bracket:

(i) the placement of the sheath stop on the bracket in the detachable attachment arrangement;

(ii) the placement of the system of cables along the guide rail(s) of the window lift with a tension of the cable passing through the sheath stop that is less than the tension of the cable when the sheath stop is received in the housing in locking position.

BRIEF DESCRIPTION OF THE DRAWINGS

Other features and advantages of the invention will become apparent upon reading the following description of a preferred embodiment of the invention, which is given as an example and in reference to the appended drawing.

FIG. 3 represents a diagrammatic perspective view of the plate of the window lift of FIG. 2, on which a sheath stop is mounted in locking position.

FIGS. 4 and 5 represent a diagrammatic perspective view of the sheath stop of FIG. 3 and of a bracket for such a sheath stop, respectively.

FIG. 6 represents a diagrammatic perspective view of the bracket on which the sheath stop is mounted in different positions.

FIG. 7 represents a diagrammatic perspective view of the plate on which the sheath stop is mounted on the bracket in the premounted position.

DETAILED DESCRIPTION

Figure 1:
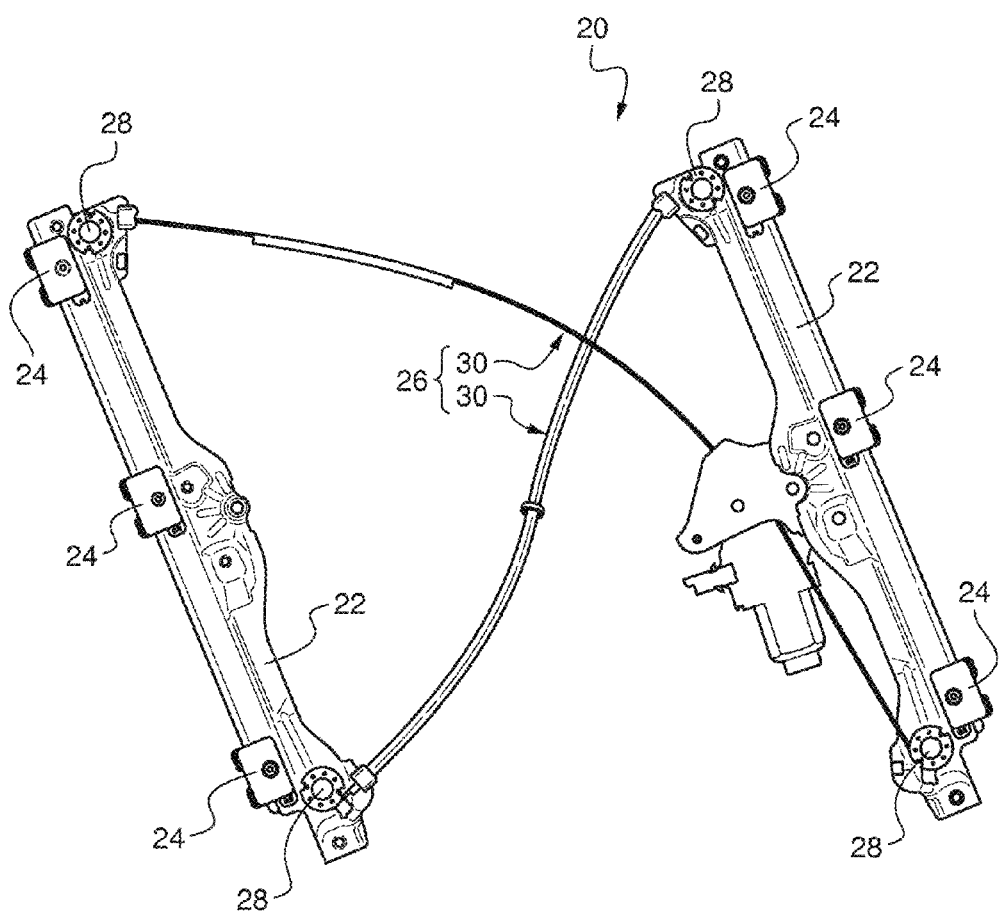
FIG. 1 represents a diagrammatic view of a known type of window lift.
Figure 2:
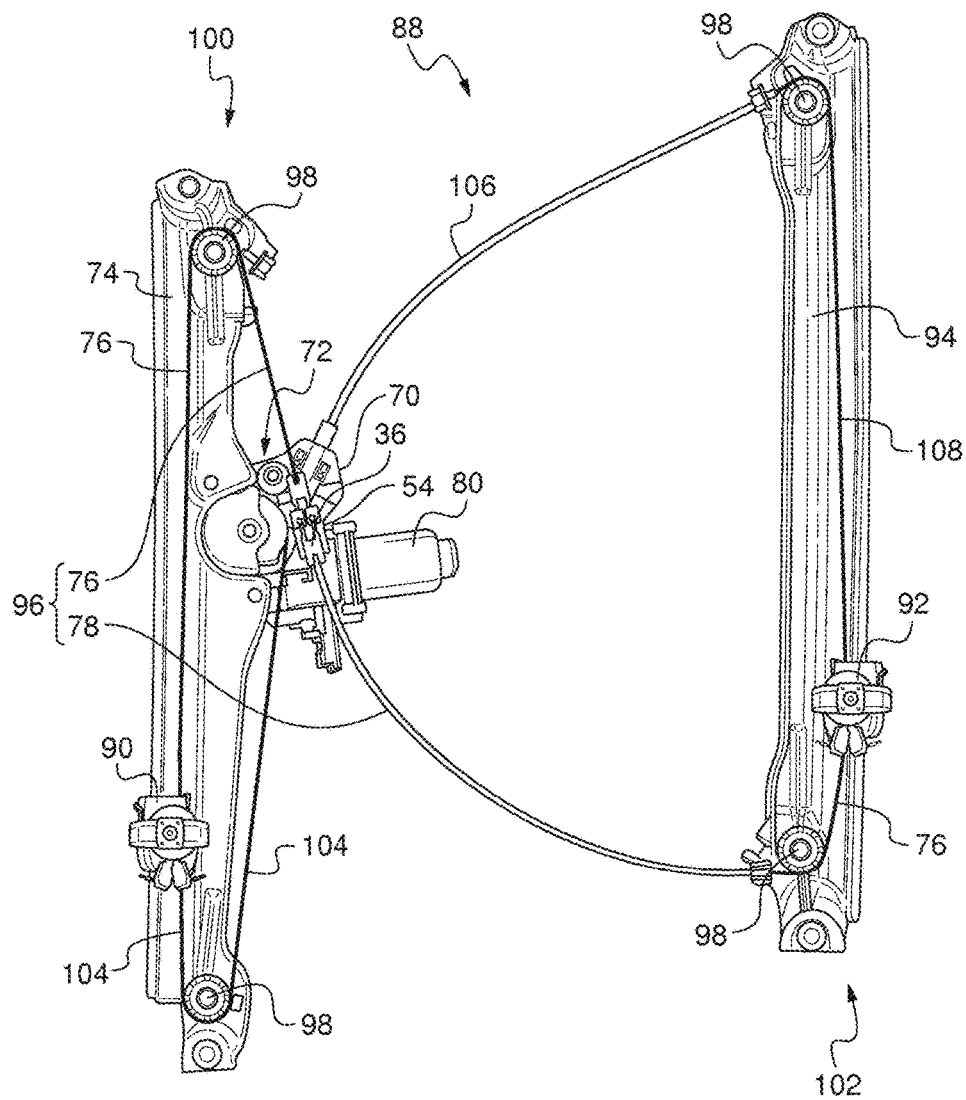
FIG. 2 represents a diagrammatic view of another type of window lift.

In reference to FIG. 2, the window lift 88 is proposed. In a manner similar to the window lift 20 illustrated above in FIG. 1, the window lift 88 also comprises two sliders: the slider 90 and the additional slider 92. The window lift 88 comprises two guide rails for the sliders 90 and 92: the guide rail 74 and the additional guide rail 94 arranged parallel facing one another. In a manner similar to FIG. 1, the window lift 88 in FIG. 2 includes a system of cables and a drum 72 for winding the cable system. The drum 72 is associated with a geared motor 80 of the window lift 88, the drum 72 and the geared motor 80 being mounted on a plate 70 arranged on a guide rail 74 of the window lift 88. The geared motor 80 supplies the motor energy for the activation of the window lift 88, and the drum 72 ensures the transmission of this driving power to the sliders 90 and 92 by means of the system of cables.

The system of cables thus connects the sliders 90 and 92 to the drum 80 for moving the sliders 90 and 92 along their respective guide rail 74 and 94. The cable system is then formed from the cable 76 with its sheath 78 (assembly referenced 96), the cable 108 with its sheath 106 and the cable 104. The cable 104 connects the drum 72 to the slider 90. The cable 108 connects the drum 72 to the slider 92. The cable 76 connects the slider 90 to the additional slider 92, passing directly from an end 100 of the guide rail 74 to an end 102 of the additional guide rail 94.

The cables 76 and 108 with their respective sheath 78 and 106 form partially sheathed cables known under the name of "Bowden" cables. A partially sheathed cable is understood to mean a cable surrounded by a sheath over a portion of the length of this cable. In the partially sheathed portion, such Bowden cables ensure the transmission of the movement of the cable under tension and this regardless of the pathway of the sheath. In spite of the presence of a nonrectilinear portion, the system of cables can thus connect the sliders 90 and 92 to the drum 72 while being under tension, as illustrated in FIG. 2.

The mounting of the system of cables on the window lift 88 is carried out by connecting the cables to the sliders 90 and 92 and by passing the cables around the pulleys forming deflecting rollers 98. The tensioning of the system of cables on the window lift 88 is achieved by the cooperation of a sheath stop 36 with a bracket 54 on the plate 70.

FIG. 3 represents an enlarged view of the plate 70 provided with the bracket 54 and the sheath stop 36. The sheath stop 36 is used here to stop the sheath 78 of the assembly 96 connecting the sliders 90 and 92 to one another. The bracket 54 and the corresponding sheath stop 36 cooperate then preferably on the plate 70 connected to the guide rail 74, in such a manner as to form an intermediate point of attachment of the cable 76 between the pulleys forming deflecting rollers 98 of the two opposite ends of the guide rails 74 and 94 in order to limit the range of movement of the cable 76. However, the sheath stop 36 can be used to stop any Bowden cable sheath of a window lift 88 while facilitating the tensioning of the cable as it is being mounted on the window lift 88. As illustrated, the bracket 54 can form one piece with the plate 70. That is to say the bracket 54 and the plate 70 form a single piece.

The sheath stop 36 is represented in detail in FIG. 4 in the absence of the cable 76 which passes through it in FIGS. 2 and 3, of the sheath 78 which the sheath stop 36 stops, and of the bracket 54 with which the stop 36 is capable of cooperating. As illustrated, the sheath stop 36 is one piece, that is to say it is formed here from only a single piece made of plastic, for example.

The sheath stop 36 includes a hole 38 for passage of the cable 76 through the sheath stop 36. This passage hole 38 extends in a main direction A which corresponds to the direction in which the sheath 78 is inserted in the sheath stop 36. In order to ensure the locking of the sheath 78 of the window lift cable 76 inserted in the sheath stop 36, the sheath stop 36 also includes a sheath abutment 44. The sheath abutment 44 is arranged on one side 46 of the passage hole 38, hereafter referred to as the sheathed cable side.

On another side 48 of the passage hole 38, hereafter referred to as the bare cable side, the passage hole 38 forms a partial slit 40 extending along the main axis A in such a manner as to form two arms 42 on either side of the slit 40. The slit 40 is referred to as partial because it does not extend over the entire length of the passage hole 38.

On the bare cable side, the sheath stop 36 also comprises two stubs 52 (only one being illustrated) forming a shaft 50 extending transversely to the orientation of the passage hole 38. In other words, the direction C of the shaft 50 is not parallel to the direction A of extension of the hole 38. Relative to the direction C, the slit 40 forms an extension of the passage hole 38 in a plane. In the case illustrated, where the stubs 52 have a circular shape, the direction C of the shaft 50 corresponds to the axis of revolution of the stubs 52. Each stub 52 is borne by a respective arm 42, and the stubs 52 are thus separated by the partial slit 40 of the passage hole 38. In addition, the two stubs 52 forming the shaft 50 are provided so as to be mounted on the stop bracket 54 with which the sheath stop 36 cooperates as illustrated in FIGS. 2 and 3.

The sheath stop bracket 54 is illustrated in detail in FIG. 5. The bracket 54 comprises a housing 56 for receiving the sheath stop 36 in locking position. The locking position of the stop 36 in the bracket 54 corresponds to the position illustrated in FIGS. 2 and 3. In other words, the locking position corresponds to the situation in which the sheath stop 36, through which the cable 76 passes and which stops the sheath 78, is mounted definitively on the bracket 54. In this locking position, it is provided that the cable 76 is taut relative to its sheath 78. The housing 56 of the bracket 54 comprises a clamp 62 forming a spring in order to lock the sheath stop 36 in locking position. In other words, the clamp 62 forming a spring is a "clip" for locking the sheath stop 36. The bracket 54 also comprises an opening 64 for the passage of the cable through the bracket 54 when the sheath stop 36 is in locking position.

The sheath stop bracket 54 also comprises a mounting interface 58 for the shaft 50 of the sheath stop 36. Thus, the stubs 52 forming the shaft 50 are provided so as to cooperate with the mounting interface 58 in such a manner that the sheath stop 36 has a freely rotatable mounting configuration on the bracket 54. In such a configuration, only the stubs 52 of the sheath stop 36 cooperate with the bracket 54, in such a manner that, in spite of the mounting of the stop 36 on the bracket 54, the stop 36 is still free to pivot about the direction C of the shaft 50. This free rotation is possible as long as the sheath stop 36 is not brought into the locking position defined by the housing 56. When the sheath stop 36 is swiveled in the housing 56 in such a manner as to extend beyond the clip 62, the swiveling in the reverse direction of the stop 36 is no longer allowed, which thus corresponds to a switch from the freely rotatable mounted configuration to the locking position.

In order to facilitate this cooperation in the freely rotatable mounting configuration, the mounting interface 58 comprises, for each stub 52, a corresponding guide groove 60. As illustrated, the corresponding groove 60 and the stub 52 form a cam and cam follower system, respectively. Thus, the free rotation of the sheath stop 36 relative to the bracket 54 on which the stop 36 is mounted can be combined with a movement of translation of the stop 36 relative to the bracket 54 as a function of the shape of the groove 60. In other words, depending on the embodiments, the free pivoting of the stop may not be limited to only a rotation of the stop relative to the bracket 54. In reference to the shape of the groove 60 illustrated in FIG. 5, when the sheath stop 36 is pivoted freely to the locking position, the stub 52 thus moves longitudinally in direction A until it is positioned in abutment against an end of the groove 60.

FIG. 6 represents different mounting positions of the sheath stop 36 in the bracket 54. The sheath stop 36 is represented, on the one hand, in two positions corresponding to the freely rotatable mounting configuration and, on the other hand, in the locking position. In the locking position, the direction A of the passage hole 38 coincides with the direction A0 illustrated in FIG. 6. The other two positions of the stop 36, shown superposed, correspond to a high position and an intermediate position, respectively, each of these positions being part of the freely rotatable mounting configuration of the sheath stop 36 on the bracket 54. In the intermediate position, the direction A of the passage hole 38 coincides with the direction referenced A1 here. In the high position, the direction A of the passage hole 38 coincides with the direction referenced A2 here.

In reference to the high position, the cable 76 (not illustrated in this figure) passing through the sheath stop 36, passes through the passage hole 38 substantially in direction A2 and it can then exit the stop 36 from the start of the partial slit 40 in the direction referenced B. The partial slit 40 forms a partial side clearance of the passage hole 38 allowing a degree of bending freedom for the cable 76. Because of the shape of the slit 40, this bending is allowed in the plane perpendicular to the shaft 50, that is to say in the plane perpendicular to the direction C. When the cable 76 is tensed, the cable 76 attached to the bracket 54 by means of the sheath stop 36 can use the degree of bending freedom allowed by the slit 40.

Indeed, the cable 76, when it is mounted so that it is under tension on the window lift 88, by passing around the pulleys forming deflecting rollers 98, follows the shortest path possible between the different points where it passes. Now, the path of the cable 76 in direction A2 and then as soon as possible in direction B, that is to say from the start of the slit 40 on, represents the shortest path connecting the pulleys forming deflecting rollers 98 of the window lift 88 and the sheath stop 36 in a freely rotatable mounting configuration on the bracket 54. This path is, in particular, shorter than the path of the cable 76 consisting in following the direction A over the entire length of the passage hole 38 from the sheathed cable side 46 to the shaft 50 of the sheath stop 36. Given this shorter path, when the sheath stop 36 is pivoted about the shaft 50 on the bracket 54 until it reaches the locking position, the tension of the cable 76 increases. The slit 40 forming the clearance in the plane perpendicular to the shaft 50 makes possible the continuous increase of the tension between the high position and the locking position.

The mounting of the sheath stop 36 for tensioning the cable of the window lift can thus be brought about by placing, in a first step, the sheath stop 36 on the bracket 54 in a freely rotatable mounting configuration and then, in a second step, by pivoting the sheath stop 36 about the shaft 50 until the locking position is reached so as to tension the cable. The mounting is thus facilitated particularly due to the fact that, in position in direction A2, the sheath stop 36 having already been mounted on the bracket 54, the forces supplied by the operator in order to arrive in this position are then taken up by the bracket 54. The operator can then supply a separate force for the swiveling of the stop 36 from the position in direction A2 until the locking position of the stop 36 in the direction A0 is reached. As a nonlimiting example, the operator can then succeed in tensioning the cable system at 60 N by providing only force fractions that do not exceed 30 N:30 N for the first step of freely rotatable mounting, and 30 N for the swiveling. The force to be supplied for the mounting of the cable system directly tensioned on the window lift 88 is then divided. This ease of mounting makes it possible to dispense with a specific tool for the operator.

According to a preferred embodiment, the bracket 54 can comprise an arrangement 82 illustrated in FIG. 3. The arrangement 82 comprises a sheath stop abutment 84 in which an opening 86 is formed for the passage of the cable 76 through the bracket 54. This arrangement 82 allows the detachable attachment of the sheath stop 36 in a premounting position.

FIG. 7 shows the sheath stop 36 received in the premounting position provided by the arrangement 82. Thus, before the placement of the sheath stop 36 in the freely rotatable mounting configuration on the bracket 54, it can be provided to arrange the stop 36 in the premounting arrangement 82. The cable 76 being fastened temporarily to the window lift 88 by means of the plate 70, the mounting operator has his hands free to place the system of cables along the guide rails 74 and 94 and around the pulleys forming deflecting rollers 98. The premounting arrangement 82 on the plate 70 is then selected in order to allow that such a placement of the system of cables around the pulleys forming deflecting rollers 98 is implemented with a low cable tension, possibly zero cable tension, in any case a cable tension less than nominal operating tension of the window lift 88.

The receiving by detachable attachment in the arrangement 82 can be implemented by wedging the sheath stop 36 directly in the bracket 54. Alternatively, the detachable attachment in the premounting position can be implemented by wedging the sheath 78 of the cable 76 in the opening 64 for passage of the cable 76 through the bracket 54, when the sheath stop 36 is in locking position. The arrangement 82 can be implemented separately from the housing 56. That is to say, the arrangement 82 and the housing 56 are formed on two different pieces.

Naturally, the present invention is not limited to the examples and to the embodiment that have been described and represented, but can instead have numerous variants accessible to the person skilled in the art.

In particular, according to a variant, stubs (not represented) can be formed on the bracket 54 instead of being formed on the sheath stop like the stubs 52 described above. According to an embodiment, the shaft 50 of the sheath stop 36 is formed by two bearings (not represented) provided for being mounted on the corresponding stubs of the bracket 54. The mounting of the bearings on the stubs of the bracket 54 corresponds to the mounting of the sheath stop on the bracket in a freely rotatable mounting configuration on the bracket 54. In other words, the bearings define a direction about which the sheath stop 36 pivots freely, when the sheath stop is mounted on the bracket 54 with the bearings of the sheath stop cooperating with the stubs of the bracket. The direction so defined corresponds to the direction of the shaft 50 formed by the bearings of the sheath stop 36. The bearings can assume the shape of a cylindrical hole or the shape of a groove one of whose ends has a partially cylindrical profile. The cylindrical shapes make it possible to guide the freely rotatable movement of the sheath stop about the corresponding stubs of the brace. For such embodiments of the bearings, the direction of the shaft 50 thus formed corresponds to the axis of the cylindrical hole or to the axis of the cylindrical portion of the profile.

In a manner similar to the stubs 52 of the above-described embodiment, the bearings can be arranged on either side of the passage hole 38, being separated by the side clearance 40 of the passage hole 42.

According to a variant that is compatible with the previous variant, a clamp similar to the clamp 62 can be formed on the sheath stop 36. Such a clamp cooperates with the bracket 54 in order to lock the sheath stop 36 when the sheath stop 36 is pivoted in the housing 56 in locking position.

The invention claimed is:

1. A sheath stop for a sheath partially surrounding a window lift cable, the sheath stop including:
    a hole defined by the sheath stop and extending axially along a longitudinal direction of the sheath stop from a first end of the sheath stop to a second end of the sheath stop for passage of the window lift cable through the sheath stop;
    a sheath abutment for locking the sheath of the window lift cable passing through the sheath stop, the sheath abutment located proximate the first end of the sheath stop;
    a shaft extending transversely relative to the longitudinal direction of the hole and located proximate the second end of the sheath stop, the shaft mountable on a bracket for pivotably mounting the sheath stop on the bracket in a freely rotatable mounting configuration; and
    an aperture defined by the sheath stop, the aperture adjacent the hole to provide a side clearance that allows the cable passing through the sheath stop a bending freedom in a plane perpendicular to the shaft when the sheath stop freely pivots about the shaft.

2. The sheath stop according to claim 1, wherein the shaft is formed from two stubs extending on either side of the passage hole of the sheath stop, the stubs being separated by the side clearance of the passage hole.

3. The sheath stop according to claim 1, further comprising two bearings operatively coupled to the sheath stop to form the shaft, the bearings being provided for being mounted on two corresponding stubs formed on the bracket and extending toward the bearings during the mounting of the sheath stop on the bracket in the freely rotatable mounting configuration on the bracket, the two bearings being arranged on either side of the passage hole and being separated by the side clearance of the passage hole.

4. The sheath stop according to claim 1, wherein the bracket includes a housing for receiving in locking position the sheath stop, the housing including an interface for mounting the shaft of the sheath stop, so that, when the shaft cooperates with the mounting interface, the bracket is suitable for allowing the free rotation of the sheath stop until reaching the locking position in the housing.

5. The sheath stop according to claim 4, wherein the housing comprises a clamp forming a spring and suitable for locking the sheath stop when the sheath stop is pivoted in the housing in locking position.

6. The sheath stop according to claim 5, wherein the mounting interface is suitable for cooperating with the shaft of the sheath stop formed by two stubs, the mounting interface comprising, for each stub, a corresponding groove for guiding when the sheath stop is in the freely rotatable mounting configuration.

7. The sheath stop according to claim 5 in combination with a guide rail of a window lift.

8. The sheath stop according to claim 4, wherein the mounting interface is suitable for cooperating with the shaft of the sheath stop formed by two stubs, the mounting interface comprising, for each stub, a corresponding groove for guiding when the sheath stop is in the freely rotatable mounting configuration.

9. The sheath stop according to claim 4 in combination with a guide rail of a window lift.

10. The sheath stop according to claim 9, wherein the guide rail comprises a plate for receiving a drum for winding a system of window lift cables, the sheath stop bracket forming one piece with the plate.

11. An assembly, including:
a sheath stop for a sheath partially surrounding a window lift cable, the sheath stop including:
a hole defined by the sheath stop and extending axially along a longitudinal direction of the sheath stop from a first end of the sheath stop to a second end of the sheath stop for passage of the window lift cable through the sheath stop;
a sheath abutment for locking the sheath of the window lift cable passing through the sheath stop, the sheath abutment located proximate the first end of the sheath stop;
a shaft extending transversely relative to the longitudinal direction of the hole and located proximate the second end of the sheath stop, the shaft mountable on a bracket for the sheath stop to pivotably mount the sheath stop on the bracket in a freely rotatable mounting configuration; and
an aperture defined by the sheath stop, the aperture adjacent the hole to provide a side clearance that allows the cable passing through the sheath stop a bending freedom in a plane perpendicular to the shaft when the sheath stop freely pivots about the shaft wherein the bracket includes a housing for receiving the sheath stop in a locking position, the housing including an interface for mounting the shaft of the sheath stop, the bracket allowing the free rotation of the sheath stop until reaching the locking position in the housing when the shaft cooperates with the mounting interface the shaft of the sheath stop mounted in the mounting interface.

12. The sheath stop according to claim 11, wherein the shaft is formed from two stubs extending on either side of the passage hole of the sheath stop, the stubs being separated by the side clearance of the passage hole.

13. The sheath stop according to claim 11, further comprising two bearings operatively coupled to the stop sheath to form the shaft, the bearings being provided for being mounted on two corresponding stubs formed on the bracket and extending toward the bearings during the mounting of the sheath stop on the bracket in the freely rotatable mounting configuration on the bracket, the two bearings being arranged on either side of the passage hole and being separated by the side clearance of the passage hole.

14. A window lift, comprising:
a slider for moving a window;
a guide rail for the slider, including a sheath stop bracket, wherein the guide rail comprises a plate for receiving a drum for winding a system of window lift cables, the sheath stop bracket forming one piece with the plate, wherein the system of cables are configured for moving the slider along the guide rail, the system of cables including:
a cable; and
a sheath partially surrounding the cable, in which the cable freely slides in order to allow the moving of the slider along the guide rail when the cable is tensioned, the slider movable even during a bending of a portion of the cable that is surrounded by the sheath,
the cable passing through the sheath stop of the assembly through a passage hole defined by the sheath stop and extending axially along a longitudinal direction of the sheath stop from a first end of the sheath stop to a second end of the sheath stop, with the sheath arranged facing a sheath abutment of the sheath stop, the sheath abutment located proximate the first end of the sheath stop;
the bracket being arranged on the guide rail so that, in a freely rotatable mounting configuration, pivoting of the sheath stop towards a locking position increases the tension of the cable.

15. The window lift according to claim 14, wherein the window lift includes an additional slider and a respective additional guide rail, the cable passing through the sheath stop connecting an end of the guide rail to an end of the additional guide rail, the cable passing through the sheath stop connecting the slider to the additional slider.

16. The sheath stop according to claim 14, wherein the guide rail comprises a plate for receiving a drum for winding a system of window lift cables, the sheath stop bracket forming one piece with the plate.

* * * * *